Nov. 16, 1926.

R. SCHULTZ
CUTLERY SHARPENER
Filed May 27, 1925

1,606,813

INVENTOR
R.Schultz
BY
ATTORNEY

Patented Nov. 16, 1926.

1,606,813

UNITED STATES PATENT OFFICE.

RICHARD SCHULTZ, OF NEW YORK, N. Y.

CUTLERY SHARPENER.

Application filed May 27, 1925. Serial No. 33,124.

The main object of this invention is to provide a cutlery grinder having for its novel characteristics a pair of angularly disposed emery wheels, one projecting into the other to form a tapering slit between them in which the article to be sharpened is projected.

Another feature of the invention is a means for rotating these emery wheels in opposite directions to each other so that binding of the article being sharpened is prevented.

The above and other objects will become apparent in the description below, in which characters of reference refer to like-named parts in the drawing.

Referring briefly to the drawing, Figure 1 is a sectional elevational view of the cutlery grinder.

Figures 1, 2:
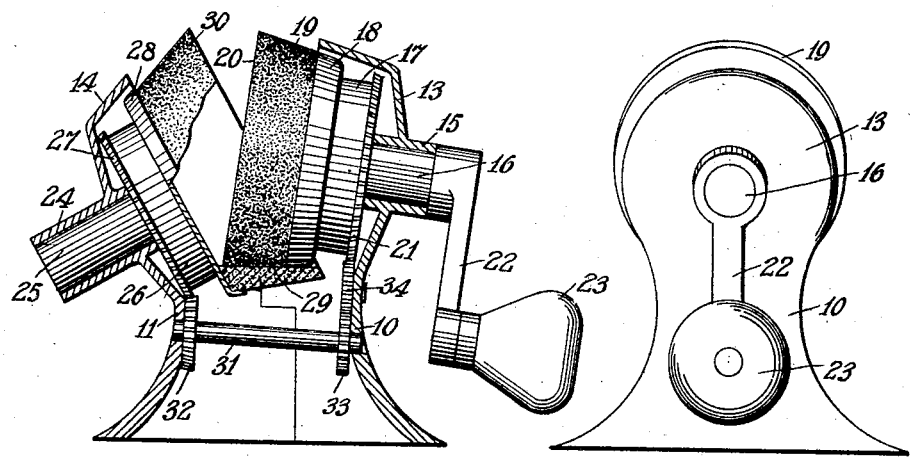
Figure 2 is a end elevational view of the same.
Figures 3, 4:
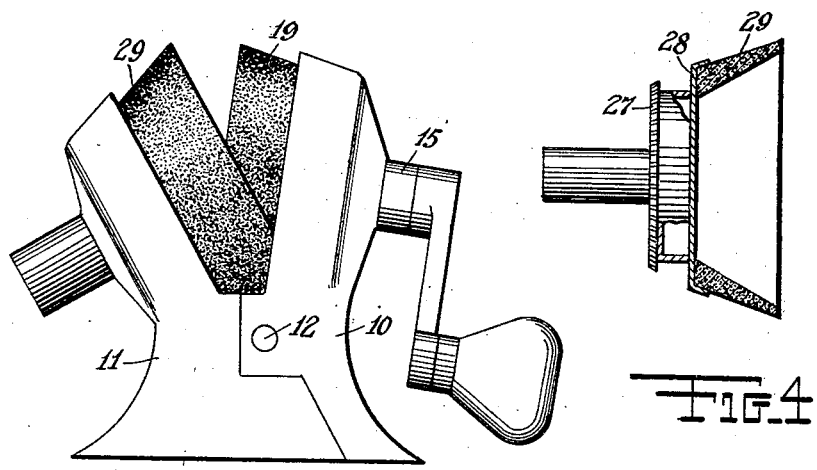
Figure 3 is an external side elevational view of Figure 1.
Figure 4 is a sectional elevational view of one of the emery wheels.

Referring in detail to the drawing, the numerals 10 and 11 indicate the body frames in which the entire device is mounted or enclosed. These body frames are coupled and interlocked by screws 12, one on each side of the frame. The upper ends of these frame members 10 and 11 are formed into cup-shaped elements 13 and 14 which are open on mutually adjacent sides and are angularly disposed toward each other, the angle being divergent. Axially in the cup-shaped member, a sleeve 15 is formed integral with member 13 and within this sleeve, a shaft 16 is rotatably housed. Projecting from one end of the shaft is a hub structure 17 on which a dished-out plate 18 is mounted. This dished-out plate provides an anchoring means for an emery wheel 19 having a diverging periphery and a flat face 20. On the face of the hub between the shaft 16 and said hub, a spur gear 21 is mounted. The opposite end of the shaft has a crank arm 22 rigidly mounted thereon on which a knob handle 23 is rotatably secured, which when manipulated, rotates the shaft and all the parts attached thereto. The opposite shell 14 is also provided with a sleeve 24 having a shaft 25 rotatable therein. This shaft supports a hub 26 and a spur gear wheel 27 which is housed within the shell 14. Attached to the hub, is a dished-out plate 28 in which an emery wheel 29 having a flat face 30 and a diverging periphery is housed and permanently secured. The sleeves 15 and 24 are angularly disposed toward each other so that the faces 20 and 30 of the emery wheels intersect, as illustrated in Figures 1 and 3, forming a V-shaped groove. This V-shaped groove is formed by providing the emery wheels of such proportion that wheel 29 is of smaller diameter than the wheel 19 so that the latter can project into the interior of the wheel 29. The frames 10 and 11 is of hollow construction and near its lower end beneath the sleeves 15 and 24, a spindle 31 is rotatably journalled in openings provided for the purpose. Near one end of said spindle, a pinion gear 32 is rigidly mounted and meshes with the spur gear 27 rigid on the shaft 25. Near the opposite end of the spindle, an additional pinion 33 is mounted which meshes with a pinion 34, the latter being in continual mesh with the spur gear 21 rigid on the shaft 16.

The article, such as a penknife, scissors, or the like, which is to be sharpened, is placed in the V-shaped groove between the faces 20 and 30 of the emery wheels 19 and 29 respectively. The crank arm 22 is then rotated by swinging the knob handle 23 thru a circular path. In rotating this crank arm, the shaft 18 and the emery wheel is rotated in one direction. Rotation of the opposite shaft 25 and the emery wheel 29 is transmitted thru the pinion 34 and pinion 33 which latter rotates in a direction opposite to the rotation of the shaft 16. Rotation of the spindle 39 is transmitted thru the shaft 25, thru the pinion 32 and the spur gear 27, the latter being rigid on the shaft 25. Were these emery wheels 19 and 29 to rotate in the same general direction, the article being sharpened would stick or bind in the V-shaped groove and prevent rotation of the emery wheels. For this reason, the gear mechanism is provided so that said emery wheels rotate in mutually opposite directions.

I claim:—

A cutlery sharpener comprising a pair of interlocked frames having shell members rigid therewith, the shells being angularly disposed toward each other, sleeves rigid with said shells, shafts in said sleeves, said shafts having their vertical axes in the same plane, emery wheels mounted on said shafts one emery wheel being smaller than the opposite wheel, the smaller emery wheel projecting into the larger to provide a V-shaped groove between them, gears on said emery wheel shafts, the large wheel having a cone-shaped hollow receptive of a portion of the periphery of the smaller wheel, a spindle beneath said shafts rotatably mounted in the frames, pinions rigid on said spindle, one of said pinions engaging the shaft of the larger emery wheel, an additional pinion mounted above the pinion on the opposite end of said spindle and adapted to mesh with the spindle pinion and the gear on the shaft supporting a smaller emery wheel, said additional pinion being adapted to reverse the rotation of one emery wheel with respect to the other, a crank arm on the shaft supporting the smaller emery wheel, and a knob handle on said crank for manipulating the latter.

In testimony whereof I affix my signature.

RICHARD SCHULTZ.